(12) United States Patent
Hoffmann et al.

(10) Patent No.: US 12,344,206 B2
(45) Date of Patent: Jul. 1, 2025

(54) HYDRAULIC BRAKING SYSTEM, INCLUDING A CONTROL SYSTEM, AND METHOD FOR CONTROLLING SAID BRAKING SYSTEM

(71) Applicant: ZF Active Safety GmbH, Koblenz (DE)

(72) Inventors: Elmar Hoffmann, Meinborn (DE); Jonas Lahnstein, Dornburg (DE); Boris Koeth, Weitersburg (DE); Frank Schmidt, Brodenbach (DE); Harald Thelen, Niederfell (DE)

(73) Assignee: ZF Active Safety GmbH, Koblenz (DE)

( * ) Notice: Subject to any disclaimer, the term of this patent is extended or adjusted under 35 U.S.C. 154(b) by 497 days.

(21) Appl. No.: 17/720,407

(22) Filed: Apr. 14, 2022

(65) Prior Publication Data

US 2022/0340116 A1 Oct. 27, 2022

(30) Foreign Application Priority Data

Apr. 22, 2021 (DE) .......................... 102021110233.2

(51) Int. Cl.
*B60T 13/58* (2006.01)
*B60L 7/26* (2006.01)
*B60T 13/14* (2006.01)

(52) U.S. Cl.
CPC .............. *B60T 13/586* (2013.01); *B60L 7/26* (2013.01); *B60T 13/148* (2013.01); *B60T 2270/604* (2013.01)

(58) Field of Classification Search
None
See application file for complete search history.

(56) References Cited

FOREIGN PATENT DOCUMENTS

| CN | 111976680 A | * | 11/2020 | ................ | B60L 7/18 |
| CN | 111976683 A | * | 11/2020 | ................ | B60L 7/24 |
| DE | 102019135650 A1 | * | 6/2020 | ................ | B60L 7/26 |
| EP | 3038866 B1 | | 10/2017 | | |
| WO | 2014082885 A1 | | 6/2014 | | |

OTHER PUBLICATIONS

CN-111976680-A—Machine translation (Year: 2020).*
CN-111976683-A—Machine translation (Year: 2020).*
DE-102019135650-A1—Machine translation (Year: 2020).*

* cited by examiner

*Primary Examiner* — Melanie Torres Williams
(74) *Attorney, Agent, or Firm* — Kristin L. Murphy

(57) ABSTRACT

The disclosure relates to a method for operating a hydraulic braking system in a motor vehicle having a regenerative braking function. The method comprises steps that, with respect to at least two wheel brakes, a hydraulic free travel release is carried out such that, with respect to one of the at least two wheel brakes, a hydraulic passage to an accumulator is released in order to store therein at least a volume fraction of the hydraulic fluid in the event of a displacement of a hydraulic fluid. The other of the at least two wheel brakes is hydraulically isolated. The disclosure also relates to a hydraulic braking system for a motor vehicle having a regenerative braking function and a method for controlling said braking system.

18 Claims, 4 Drawing Sheets

HYDRAULIC BRAKING SYSTEM, INCLUDING A CONTROL SYSTEM, AND METHOD FOR CONTROLLING SAID BRAKING SYSTEM

CROSS-REFERENCE TO RELATED APPLICATION

This application claims priority to German Priority Application No. 102021110233.2, filed Apr. 22, 2021, the disclosure of which is incorporated herein by reference in its entirety.

TECHNICAL FIELD

The disclosure relates to a hydraulic braking system for a motor vehicle having a regenerative braking function. The disclosure also relates to a method for operating such a hydraulic braking system. The disclosure further relates to a computer program product, a control unit, and a motor vehicle.

BACKGROUND

Hydraulic braking systems are used, for example, in motor vehicles and mainly serve as a service brake for the motor vehicle. Braking usually takes place when the driver of the motor vehicle operates a brake pedal, thus displacing a hydraulic fluid from a brake cylinder to at least one wheel brake, so that a braking force is present at the wheel brake, which acts on an assigned vehicle wheel. This hydraulic braking force effected by the hydraulic fluid usually corresponds to a braking force request which is brought about by the driver by actuating the brake pedal, Modern motor vehicles with hydraulic braking systems increasingly have a regenerative braking function. Such a braking function is usually based on a recuperation process and is often realized in the following way: When a braking force request is applied by actuating the brake pedal, the kinetic energy of the motor vehicle drives, at least temporarily, an electrical machine in generator mode and supplies electric energy which can be used, for example, to charge an electric energy storage device of the motor vehicle. The electrical machine used for this purpose is usually the electrical machine which forms an electrical drive for the motor vehicle, for example, as a main drive or secondary drive, and is then operated as a generator in the course of an occurring regenerative braking process, However, operating the electrical machine as a generator is accompanied by a drag torque which originates from the electrical machine and has a braking effect on the motor vehicle. This braking force caused by the electrical machine, which in the following is also called a generative braking force, must be taken into account when dimensioning the hydraulic braking force to be applied in order to correspond to a braking force request that is applied by the driver by actuating the brake pedal. A possible concept in this respect is described in WO 2014/082885 A1.

A method for controlling a hydraulic braking system during a regenerative braking process is known from said document. In the known method, at least a volume fraction of a hydraulic fluid which is displaced by a brake cylinder in the direction of a wheel brake is temporarily stored in a hydraulic accumulator. In this way, it is possible that, with a predetermined braking force request and an associated displacement of the hydraulic fluid, a hydraulic braking force effect on the wheel brake does at least not occur to the extent that the electrical machine can be integrated to generate electric energy and, despite the generative braking force originating from the electrical machine, the resulting total braking force corresponds to the applied braking force request.

What is needed is a possibility for improving the previous concept of regenerative braking.

SUMMARY

The present disclosure is directed to a method for operating a hydraulic braking system.

One exemplary arrangement of a method for operating a hydraulic braking system in a motor vehicle having a regenerative braking function comprises a step that, with respect to at least two wheel brakes of the hydraulic braking system, a hydraulic free travel release is carried out such that, with respect to one of the at least two wheel brakes, a hydraulic passage to an accumulator is released in order to store therein at least a volume fraction of the hydraulic fluid in the event of a displacement of a hydraulic fluid, for example, due to an actuation of a brake cylinder. The at least one other wheel brake is hydraulically isolated, and in exemplary arrangement, completely hydraulically isolated. In one particular exemplary arrangement, the at least one other wheel brake is hydraulically isolated from the brake cylinder that causes a displacement of the hydraulic fluid. In one particular arrangement, the hydraulic passage to the accumulator is first released with respect to the one wheel brake and then the at least one other wheel brake is hydraulically isolated. In principle, it is also possible to first hydraulically isolate the at least one other wheel brake and then release the hydraulic passage to the accumulator. Hydraulic isolation and release can also take place simultaneously.

In the present description, the term "free travel release" refers to a switching of at least one or more actuators of the hydraulic braking system to such a position or such a state that, when the hydraulic braking system is actuated, i.e., when a hydraulic fluid is displaced in the direction of the at least two wheel brakes, at least a volume fraction of the hydraulic fluid is stored, in particular temporarily stored, in at least one accumulator, for example, the above-described accumulator. It can thus be achieved that there is no pressure build-up in the at least two wheel brakes and the at least two wheel brakes consequently do not exert any hydraulic braking force, even though the hydraulic braking system has been or is being actuated. The free travel release is useful when the regenerative braking function of the motor vehicle is to be used, i.e., an existing braking force request is to be fulfilled, via the regenerative braking function of the motor vehicle.

In the proposed method, the free travel release is carried out such that one of the at least two wheel brakes, in one exemplary arrangement only one of the at least two wheel brakes, is affected. Due to the released hydraulic passage to the accumulator, it is therefore possible with respect to this at least one wheel brake that a hydraulic pressure, in particular a hydraulic residual pressure, acts therein, which is caused, for example, by the accumulator pressure of the accumulator. This hydraulic pressure or residual pressure can cause the brake linings of the wheel brake to bear against a counter-friction surface, for example, a brake disc or a brake drum, resulting in a braking effect. As a result of this friction-related braking effect, part of the kinetic energy of the moving motor vehicle is irreversibly converted into heat and is no longer available for conversion into electric energy if a recuperation process takes place in the course of a regenerative braking of the motor vehicle.

By hydraulically isolating the at least one other wheel brake, such an undesirable braking effect is counteracted in this wheel brake. As a result, a greater proportion of the kinetic energy of the motor vehicle is available for recuperation during a regenerative braking process than would be the case if the at least one other wheel brake were not hydraulically isolated, In a further exemplary arrangement, the step comprises that, with respect to the at least one other wheel brake, i.e., the at least one hydraulically isolated wheel brake or the wheel brake to be hydraulically isolated, a further hydraulic passage to the accumulator or to a further accumulator remains closed, and in one particular arrangement remains completely closed. As a result, a further measure is taken to counteract any build-up of hydraulic pressure or residual pressure in the at least one hydraulically isolated wheel brake, for example, due to the acting accumulator pressure of the accumulator, when a hydraulic fluid is displaced in the direction of the at least two wheel brakes, i.e., the hydraulic braking system is actuated, and via the released hydraulic passage, the hydraulic fluid reaches, and is stored in, the accumulator. The measure that no hydraulic passage to the accumulator or to a further accumulator is provided with respect to the at least one other wheel brake is also included for this purpose.

Alternatively, the step can also comprise that, with respect to the at least one other wheel brake, i.e., the at least one hydraulically isolated wheel brake or the wheel brake to be hydraulically isolated, a further hydraulic passage to the accumulator or to a further accumulator is released. In this case, the hydraulic isolation of the at least one other wheel brake can also counteract any build-up of hydraulic pressure or residual pressure in the at least one other wheel brake when a hydraulic fluid is displaced, i.e., the hydraulic braking system is actuated, and via the released hydraulic passage, the hydraulic fluid reaches, and is stored in, the accumulator.

As a result of the release of the further passage, the at least one other wheel brake is hydraulically connected to the accumulator or the further accumulator. As a result, a possible hysteresis behavior of the accumulator or the further accumulator can be used which, due to the system, occurs during a transition from a filling phase to an emptying phase, for example, when the associated brake pedal is released and effects a pressure difference between the hydraulic working pressure in the accumulator or the further accumulator and the hydraulic pressure in the at least one other wheel brake. Such a hysteresis behavior is present, for example, if the accumulator or the further accumulators is a piston accumulator. For example, the piston accumulator has a system-related difference in the working pressure between filling and emptying, which is caused by friction and/or the viscoelastic behavior of the seal for the piston of the piston accumulator.

A basic hydraulic braking system which is suitable, for example, for a motor vehicle having a regenerative braking function and, for example, for carrying out the above-described method, comprises a brake cylinder and at least two wheel brakes, wherein the brake cylinder is hydraulically connected to the at least two wheel brakes via a hydraulic connection, for example, via at least one brake line, and designed to displace a hydraulic fluid in the direction of the at least two wheel brakes, and wherein the at least two wheel brakes are designed to exert a hydraulic braking force by the hydraulic fluid.

The hydraulic braking system further comprises a first wheel brake and a second wheel brake, which are comprised by the at least two wheel brakes, each having a drain line for draining at least a volume fraction of the hydraulic fluid from the hydraulic connection between the brake cylinder and the associated wheel brake, and each having an opening device for opening the hydraulic connection between the brake cylinder and the associated wheel brake in order to drain the at least one volume fraction of the hydraulic fluid into the drain line. At least the first wheel brake is assigned an isolation valve for closing the hydraulic connection between the brake cylinder and the first wheel brake in order to hydraulically isolate the first wheel brake.

Furthermore, the hydraulic braking system comprises at least one accumulator which is hydraulically connected to the drain line and designed to store at least a volume fraction of the hydraulic fluid under an accumulator pressure. In addition, in one exemplary arrangement, the hydraulic braking system comprises a an electronic control unit which is signal-connected, for example, to the opening device of the first wheel brake and/or the opening device of the second wheel brake and/or the isolation valve and/or the brake cylinder, Such a hydraulic braking system allows for free travel release in the manner proposed in accordance with the above method which in the following is also called the operating method. According to one exemplary arrangement, the control unit is for this purpose designed to cause the opening device of the second wheel brake to open and the isolation valve to close when a generative braking force of an electrical machine is present or about to occur.

For example, the control unit is designed to cause the opening device of the second wheel brake to open and the isolation valve to close when an electrical signal with information about a presence or imminent occurrence of a generative braking force of the electrical machine is detected. For example, the control unit is designed to first cause the opening device of the second wheel brake to open and then to cause the isolation valve to close. In principle, the control unit can also be designed to first cause the isolation valve to close and then to cause the opening device of the second wheel brake to open. The control unit can also be designed to simultaneously cause the opening device of the second wheel brake to open and the isolation valve to close.

By opening the opening device of the second wheel brake, a hydraulic passage to the accumulator is released via the drain line of the second wheel brake. As a result, a hydraulic pressure, in particular a hydraulic residual pressure, will act in the second wheel brake, which is effected by the accumulator pressure of the accumulator when the accumulator has been or is being filled due to an actuation of the hydraulic braking system, i.e., due to an actuation of the brake cylinder and the resulting displacement of the hydraulic fluid. This hydraulic pressure or residual pressure can cause the brake linings of the second wheel brake to bear against a counter-friction surface, for example, a brake disc or a brake drum, resulting in a braking effect. As a result of this friction-related braking effect, part of the kinetic energy of the moving motor vehicle is irreversibly converted into heat and is no longer available for conversion into electric energy if a recuperation process takes place in the course of a regenerative braking of the motor vehicle.

In order to avoid or counteract said hydraulic pressure or residual pressure also acting in the first wheel brake, the first wheel brake is hydraulically isolated by closing the isolation valve. In the case of a regenerative braking process, a greater proportion of the kinetic energy of the motor vehicle is thus available for recuperation than would be the case if the at least one other wheel brake were not hydraulically isolated. The proposed approach is based on the idea that only one of the at least two wheel brakes is required to make storing, in one particular exemplary arrangement, temporary storing, of the hydraulic fluid possible by a release to the accumulator when the hydraulic braking system is actuated and the regenerative braking function of the motor vehicle is to be used. The at least one other wheel brake of the at least two wheel brakes can be present hydraulically isolated in order to keep any residual slip torques in the wheel brakes as low as possible and thus achieve the highest possible recuperation power in the course of the regenerative braking process.

In a further exemplary arrangement, the control unit is designed to cause the opening device of the second wheel brake to open and the isolation valve to close when a generative braking force of the electrical machine is present or about to occur, and when the gradient of the pedal travel of a brake pedal operatively connected to the brake cylinder or a momentary value of a parameter corresponding to the gradient of the brake pedal or the pedal travel is smaller than a default value. For example, the pedal travel is detected by a pedal travel sensor.

The gradient of the pedal travel takes into account the speed at which the brake pedal is actuated, for example, when it is stepped on. As a result, the opening of the opening device of the second wheel brake and the closing of the isolation valve can be related to a specific phase of a braking process, for example, by predetermining the default value for the gradient accordingly. For example, the default value can be set such that the opening of the opening device of the second wheel brake and the closing of the isolation valve only take place if the brake pedal is actuated at a relatively low speed, i.e., if the braking force request by a driver, for example, is relatively small. It is this phase of a braking process that lends itself to being covered by the regenerative braking function of the motor vehicle.

In a further exemplary arrangement, the control unit is designed to cause the opening device of the second wheel brake to open and the isolation valve to dose when a generative braking force of the electrical machine is present or about to occur, wherein the opening device of the first wheel brake remains in a dosed position. For example, the control unit is designed to cause the opening device of the second wheel brake to open and the isolation valve to close when a signal with information about a presence or imminent occurrence of a generative braking force of the electrical machine is detected, wherein the opening device of the first wheel brake remains in the closed position.

In one exemplary arrangement, the control unit is designed to control the opening device of the first wheel brake in order to keep the opening device of the first wheel brake in the closed position, and also to cause the opening device of the second wheel brake to open and the isolation valve to close when a generative braking force of the electrical machine is present or about to occur or when a signal with information about the presence or imminent occurrence of a generative braking force of the electrical machine is detected.

For example, the control unit is designed to cause the opening device of the second wheel brake to open and the isolation valve to close and, if necessary, to control the opening device of the first wheel brake to remain in the closed position when a generative braking force of the electrical machine is present or about to occur, and when the gradient of the pedal travel of the brake pedal or a momentary value of the or a corresponding parameter is smaller than the above-described default value or a default value.

Since the opening device of the first wheel brake remains in the closed position or is held in the closed position, a further measure is taken to counteract or avoid any hydraulic pressure or residual pressure in the first wheel brake.

In a further or another exemplary arrangement, the control unit is designed to cause the opening device of the first wheel brake and the opening device of the second wheel brake to open and to cause the isolation valve to close when a generative braking force of the electrical machine is present or about to occur. For example, the control unit is designed to cause the opening device of the first wheel brake and the opening device of the second wheel brake to open and to cause the isolation valve to close when an electrical signal with information about a presence or imminent occurrence of a generative braking force of the electrical machine is detected. For example, the control unit is designed to cause the opening device of the first wheel brake to open before or after the opening device of the second wheel brake is caused to open or the isolation valve is caused to dose, or to control the opening device of the first wheel brake simultaneously with the opening device of the second wheel brake or the isolation valve.

For example, in one exemplary arrangement, the control unit is also designed to cause the opening device of the first wheel brake and the opening device of the second wheel brake to open and to cause the isolation valve to close when a generative braking force of the electrical machine is present or about to occur, and when the gradient of the pedal travel of the brake pedal or a momentary value of the parameter or a corresponding parameter is smaller than the above-described default value or a default value.

In this exemplary arrangement, the first wheel brake is hydraulically isolated from the brake cylinder by closing the isolation valve, but by opening the opening device and thus opening the drain line, there is a hydraulic passage between the first wheel brake and the accumulator. When the hydraulic braking system is actuated, i.e., when the brake cylinder is actuated and the hydraulic fluid is thus displaced, a pressure advantage can also be achieved in this exemplary arrangement in the first wheel brake due to its hydraulic isolation. This pressure advantage results, for example, from a system-related hysteresis behavior of the accumulator, which is caused, for example, by a difference in accumulator pressure between a filling phase and an emptying phase.

Such a hysteresis behavior is present, for example, when the accumulator is a piston accumulator. For example, the piston accumulator has a system-related difference in the working pressure between filling and emptying, which is caused by friction and/or the viscoelastic behavior of the seal for the piston of the piston accumulator.

In a further or another exemplary arrangement, at least the first wheel brake is assigned a pressure relief device which is fluidically connected in parallel to the opening device of the first wheel brake and has an input side and an output side. In particular, it is provided that the pressure relief device is closed in the draining direction and opens in the opposite direction of the draining direction when a maximum pressure difference between the input side and the output side is reached. In this respect, the pressure relief device has, for example, a safety function in order to prevent the maximum pressure difference from being exceeded. The pressure relief device also has, for example, a non-return function, by which a fluid flow is only permitted in one direction, in particular in the opposite direction of the draining direction, when the pressure relief device opens.

In one exemplary arrangement, the control unit is designed to cause the opening device of the second wheel brake to open and the isolation valve to close when a generative braking force of the electrical machine is present or about to occur, wherein the opening device of the first wheel brake remains in a closed position. For example, the control unit is designed to cause the opening device of the second wheel brake to open and the isolation valve to close when a signal with information about a presence or imminent occurrence of a generative braking force of the electrical machine is detected, wherein the opening device of the first wheel brake remains in the closed position. For example, the control unit is also designed to control the opening device of the first wheel brake in order to keep the opening device of the first wheel brake in the closed position, and to also cause the opening device of the second wheel brake to open and the isolation valve to close when a signal with information about a presence or imminent occurrence of a generative braking force of the electrical machine is detected.

In this exemplary arrangement, it is taken into account that the hydraulic braking system, depending on its design and/or the design of the opening device, can have a system-related pressure relief device of the above-described type. For example, the pressure relief device and the opening device are part of a pressure reduction valve which is used, for example, in an anti-lock braking system and/or a vehicle dynamics control system and may already be present in the motor vehicle.

In a further exemplary arrangement, the pressure relief device is set to a difference value for the maximum pressure difference between the input side and the output side of the opening device of the first wheel brake, wherein the difference value is smaller than a maximum pressure difference between the accumulator pressure of the accumulator and a fluid pressure in the first wheel brake. When the hydraulic braking system is actuated, i.e., when the hydraulic fluid is displaced by the brake cylinder, and the difference value between the input side and the output side of the opening device is increased as a result, the pressure relief device opens in this case before the maximum pressure difference between the accumulator pressure of the accumulator and the fluid pressure in the first wheel brake is reached. This results in a pressure advantage in the first wheel brake at least as long as the pressure relief device remains closed.

Such a situation can exist if the opening device of the first wheel brake has a sealing element which performs the function of the pressure relief device, i.e., closes or remains closed in the draining direction and opens in the opposite direction of the draining direction, when the maximum pressure difference between the input side and the output side of the opening device is reached. For example, the sealing element is used to seal the hydraulic passage of the opening device when it is in the closed state.

In one exemplary arrangement, the sealing element is a lip seal. Due to the design, it is advantageous in the case of the lip seal that the lip seal is folded over even before the maximum pressure difference between the accumulator pressure of the accumulator and the fluid pressure in the first wheel brake is reached.

Alternatively, the pressure relief device can be set to a difference value for the maximum pressure difference between the input side and the output side of the opening device of the first wheel brake, wherein the difference value is greater than a maximum pressure difference between the accumulator pressure of the accumulator and a fluid pressure in the first wheel brake. When the hydraulic braking system is actuated, i.e., when the hydraulic fluid is displaced by the brake cylinder, and the difference value between the input side and the output side of the opening device is increased as a result, the pressure relief device does not open in this case. This prevents the creation of a hydraulic passage between the first wheel brake and the accumulator via the pressure relief device. In this way, a pressure advantage in the first wheel brake is permanently facilitated over the entire actuation process of the hydraulic braking system.

Such a situation can exist if the opening device of the first wheel brake has a sealing element which performs the function of the pressure relief device, i.e., closes or remains closed in the draining direction and opens in the opposite direction of the draining direction, when the maximum pressure difference between the input side and the output side of the opening device is reached. For example, the sealing element is used to seal the hydraulic passage of the opening device when it is in the closed state.

In one exemplary arrangement, the sealing element is an 0-ring. Due to the design, it is advantageous in the case of the 0-ring that a sealing takes place in both flow directions at least until the maximum pressure difference between the inlet side and the outlet side of the opening device is reached. In the case of an existing pressure relief device, which is provided with a lip seal, for example, as a result of the system, an improvement in the pressure situation in the first wheel brake can be achieved by replacing the lip seal with an O-ring.

In a further exemplary arrangement, the hydraulic braking system comprises a pump which is used or can be used to return at least a volume fraction of the hydraulic fluid from the drain line and/or the accumulator in the direction of the brake cylinder and/or to build up hydraulic pressure in the at least two wheel brakes. In particular, the control unit is signal-connected to the pump and designed to control the pump in order to return at least a volume fraction of the hydraulic fluid from the drain line and/or the accumulator in the direction of the brake cylinder or to build up hydraulic pressure in the at least two wheel brakes.

The opening device can be or comprise a pressure reduction valve which is, for example, a component of an anti-lock braking system and/or a vehicle dynamics control system. The pump and/or the accumulator can also be part of the anti-lock braking system or the vehicle dynamics control system.

In order to carry out the above-described operating method, a method for controlling the above-described hydraulic braking system in a motor vehicle having a regenerative braking function is proposed. In one exemplary arrangement, said control method comprises the step that the control unit causes the opening device of the second wheel brake to open and the isolation valve to close when a generative braking force of the electrical machine is present or about to occur.

For example, by operation of the control unit, first the opening device of the second wheel brake is caused to open and then the isolation valve is caused to close. In principle, the control unit can also be used to first cause the isolation valve to dose and then cause the opening device of the second wheel brake to open. The control unit can also simultaneously cause the opening device of the second wheel brake to open and the isolation valve to close.

In a further exemplary arrangement, the control unit causes the opening device of the second wheel brake to open and the isolation valve to close when a generative braking force of the electrical machine is present or about to occur, and when the gradient of the pedal travel of a brake pedal operatively connected to the brake cylinder or a momentary value of a parameter corresponding to the gradient of the pedal travel is smaller than a default value.

In a further exemplary arrangement, the control unit causes the opening device of the second wheel brake to open and the isolation valve to close when a generative braking force of the electrical machine is present or about to occur, wherein the opening device of the first wheel brake remains in a closed position. For example, the opening device of the first wheel brake is controlled by the control unit in order to keep the opening device of the first wheel brake in the closed position and in addition, the opening device of the second wheel brake is caused to open and the isolation valve is caused to close when a generative braking force of the electrical machine is present or about to occur.

For example, the control unit causes the opening device of the second wheel brake to open and the isolation valve to close and, if necessary, controls the opening device of the first wheel brake to remain in the closed position when a generative braking force of the electrical machine is present or about to occur, and when the gradient of the pedal travel of the brake pedal or a momentary value of the parameter or a corresponding parameter is smaller than the above-described default value or a default value.

In a further or other exemplary arrangement, the opening device of the first wheel brake and the opening device of the second wheel brake are caused to open by the control unit, and the isolation valve is caused to close when a generative braking force of the electrical machine is present or about to occur. For example, the control unit is used to cause the opening device of the first wheel brake to open before or after the opening device of the second wheel brake is caused to open or the isolation valve is caused to close, or to control the opening device of the first wheel brake simultaneously with the opening device of the second wheel brake or the isolation valve.

For example, by operation of the control unit, the opening device of the first wheel brake and the opening device of the second wheel brake are caused to open and the isolation valve is caused to close when a generative braking force of the electrical machine is present or about to occur, and when the gradient of the pedal travel of the brake pedal or a momentary value of the parameter or a corresponding parameter is smaller than the above-described default value or a default value.

If the hydraulic braking system has the above-described pressure relief device which is assigned to the opening device of the first wheel brake, the opening device of the second wheel brake is, according to one exemplary arrangement, caused to open and the isolation valve is caused to close by the control unit when a generative braking force of the electrical machine is present or about to occur, wherein the opening device of the first wheel brake remains in a closed position.

According to one aspect, the disclosure further relates to a computer program product having a program code stored on a medium readable by a computer for carrying out at least one exemplary arrangement of the above-described method for controlling a hydraulic braking system.

According to a further aspect, the disclosure relates to a control unit, in particular for the above-described hydraulic braking system, comprising the above-described computer program product.

According to a further aspect of the disclosure, a motor vehicle having the above-described hydraulic braking system and/or the above-described computer program product and/or the above-described control unit is provided, wherein the motor vehicle is designed in particular to carry out the above-described method for operating a hydraulic braking system.

According to one exemplary arrangement, the motor vehicle comprises at least two vehicle wheels and at least one electrical machine which is drive-connected to one of the at least two vehicle wheels and designed to be used as a generator during a braking process of the motor vehicle. The electrical machine can be the above-described electrical machine.

In one exemplary arrangement, the electrical machine is designed to be present only in generator mode, or to be switched to generator mode, in particular to be switched manually or automatically, when a braking process of the motor vehicle is about to occur, in particular when a displacement of the hydraulic fluid by the brake cylinder is about to occur. For example, the electrical machine is an electric drive of the motor vehicle, which, for example, acts as a main drive or secondary drive on the at least one vehicle wheel in a driving manner, and which is used as a generator during a braking process of the motor vehicle to charge, for example, an electric energy storage device of the motor vehicle.

In the present description, the term "regenerative braking function" refers to a mode of operation during a braking process in which kinetic energy is converted into electric energy by at least one generatively operated electrical machine, resulting at the same time in a braking effect, for example a braking effect that brakes the motor vehicle, which is also called a generative braking force in the present description. Said braking effect is affected, for example, by a drag torque originating from the electrical machine. For example, the kinetic energy results from the movement of the motor vehicle and/or from the rotational movement of the vehicle wheels. The electric energy is reused, at least to some extent. For example, at least part of the electric energy is stored in an electric energy storage device and is then available for use, for example, for driving the motor vehicle and/or for the electrical system of the motor vehicle. The braking process addressed herein is also called a regenerative braking process in the present description.

In the present description, a hydraulic braking effect effected by the wheel brake or the at least two wheel brakes is, by way of example, called a hydraulic braking force. This refers in particular to the braking effect of the wheel brake in relation to the vehicle wheel which is assigned or can be assigned to the wheel brake. If a plurality of such wheel brakes is provided, each of these wheel brakes can effect a hydraulic braking force, thus resulting in a hydraulic braking force, i.e., a hydraulic total braking force, which is composed of the individual hydraulic braking forces.

In the regenerative braking process, for example, a braking force composed of the hydraulic braking force and the generative braking force generated by the electrical machine is present, wherein the generative braking force relates, for example, to the vehicle wheel or the vehicle axle or the motor vehicle having the vehicle wheel to which the wheel brake is assigned or can be assigned. In particular, the braking force is opposed by a braking force request. In the present description, the term "braking force request" refers to a measure for a desired braking effect, which is generally also called a "braking request." If a free travel release is carried out in the hydraulic braking system, a braking force, which is essentially or exclusively formed by the generative braking force, is present in the regenerative braking process.

In the present description, the term "wheel brake" refers to a friction brake, for example, a disc brake or a drum brake.

In one exemplary arrangement, the wheel brake is designed to be used as a service brake. For example, the wheel brake is assigned to a vehicle wheel or designed to be assigned to a vehicle wheel.

In the present description, the term "brake cylinder" refers in particular to a device that generates fluid pressure. The brake cylinder can comprise a pressure piston which, for example, is held displaceably in a cylinder, and a displacement of a hydraulic fluid or a hydraulic fluid volume is affected by a displacement movement of the pressure piston relative to the cylinder. The term "brake cylinder" also comprises a feed pump or a similar feed device as a device generating fluid pressure. The brake cylinder can be a master brake cylinder. For example, the brake cylinder is a master brake cylinder, as is customary in conventional hydraulic braking systems. For example, the brake cylinder comprises a storage container and/or a refill container for the hydraulic fluid.

In the present description, the term "brake pedal" refers to an actuating device for actuating the brake cylinder. In particular, the brake cylinder interacts with an actuation device or the brake cylinder is designed to interact with an actuation device. In one exemplary arrangement, actuation of the actuation device in the brake cylinder causes a displacement of the hydraulic fluid. For example, the brake cylinder is actuated mechanically. In one exemplary arrangement, the brake cylinder is actuated purely mechanically. In another exemplary arrangement, the brake cylinder is actuated electrically or electromechanically.

For example, the actuating device comprises a foot pedal or a hand lever which, for example, acts on the brake cylinder via a piston rod to generate fluid pressure. Additionally or alternatively, the actuation device or the brake pedal can comprise an electrical machine, for example, an electric motor, wherein an output shaft of the electrical machine is coupled in a driving manner to the brake cylinder in order to actuate the brake cylinder via said output shaft. The actuating device can be actuated manually, for example, by the driver of the motor vehicle, or automatically by a vehicle control.

In the present description, the term "accelerator pedal" refers in particular to a control device for controlling and/or adjusting the engine output of the drive machine of a motor vehicle. For example, the control device is designed to control the drive machine electronically and/or mechanically. For example, the control device is also designed to be operated mechanically and/or electronically. For example, the accelerator pedal is a foot pedal or a hand lever.

In the present description, "imminent occurrence of a generative braking force of the electrical machine" means that the electrical machine must be brought into generator operation, for example, by reducing or switching off energization of the electrical machine. In particular, the energization of the electrical machine is reduced or switched off on the basis of an actuation of an actuating device coupled to the brake cylinder in an actuating manner. For example, the energization of the electrical machine is reduced or switched off on the basis of an actuation of the accelerator pedal and/or the brake pedal of the motor vehicle. The actuation device or the accelerator pedal and/or the brake pedal can be actuated by the driver of the motor vehicle or a vehicle control, such as an automated driving system or an autopilot or a driver assistance system or the like.

In the present description, the term "vehicle control" refers in particular to a control system which causes the brake cylinder to be actuated independently of an actuation of the brake pedal carried out by the driver. Such a control system, which can also be called an automatic vehicle control, can be a driver assistance system. The driver assistance system is, for example, an adaptive cruise control (ACC) which, in a radar-supported manner, controls the distance to a preceding vehicle through braking and engine interventions, or an electronic stability control (ESC) which, by selective braking of individual wheels of the motor vehicle, attempts to prevent skidding of the motor vehicle in a threshold region in curves in case of both oversteer and understeer of the motor vehicle and thus ensures control over the motor vehicle by the driver.

In the present description, the term "pump" refers to a conveying device for conveying hydraulic fluid. For example, in one exemplary arrangement, the pump is a centrifugal pump, in particular a radial piston pump or an axial piston pump. In particular, the centrifugal pump comprises at least one, in another exemplary arrangement, a plurality of, for example, two to six, working pistons, which carry out or can carry out a stroke movement for conveying the hydraulic fluid. For example, the pump comprises an electrical machine, for example, an electric motor, which is used to drive the pump. The electrical machine is designed, for example, to receive electrical control signals and to output corresponding control signals to the pump.

In the present description, the term "accumulator" refers to a hydraulic accumulator which is designed, for example, to store the hydraulic fluid under pressure or under an accumulator pressure. The volume fraction of the hydraulic fluid supplied to the accumulator is thus accommodated therein against a restoring force of the accumulator. The accumulator can be designed such that a gas or a spring element is compressed by the hydraulic fluid when the accumulator is filled. For example, the accumulator is an intermediate accumulator which is designed to temporarily store the at least one volume fraction of the hydraulic fluid. For example, in one exemplary arrangement, the accumulator is a low-pressure accumulator. For example, the accumulator is a piston accumulator.

In the present description, the term "control unit" refers to an electronic unit of computer hardware which controls specific processes and/or sequences in connection with the hydraulic braking system and, for example, an electrical machine used for regenerative braking. The control unit can have a digital processing unit which comprises, for example, a microprocessor unit (CPU). The CPU can be data- and/or signal-connected to a memory system and/or bus system. The control unit can have one or more programs or program modules. The digital processing unit can be designed such that commands that are implemented as a program stored in a memory system are processed, input signals are received from a data bus system and/or output signals are output to a data bus system. A memory system can have one or more, in one exemplary arrangement, different, memory media. The memory media can in particular be optical, magnetic, solid-state memory media and/or other, preferably non-volatile, memory media.

In the present description, the term "isolation valve" refers to a shut-off device, by which the associated wheel brake can be at least partially hydraulically decoupled, i.e., isolated, from the brake cylinder. In particular, the isolation valve is designed to close and open the hydraulic connection or the brake line between the brake cylinder and the associated wheel brake. In particular, the isolation valve is designed to completely close, or at least partially close, the hydraulic connection or the brake line. For example, the isolation valve has a passage for fluid, in particular the hydraulic fluid, which can be changed in cross section. For example, the isolation valve is designed to be adjusted between a closed position and an open position, for example, with respect to the passage, wherein the hydraulic connection or the brake line is at least partially or completely closed, i.e., blocked, in the closed position. In the above-described "closed state," which is also called the "locked state," the isolation valve is, for example, in the closed position. If the isolation valve is adjusted in the direction away from the closed state, the cross section of the passage is enlarged, for example. If the isolation valve is adjusted in the direction of the closed state, the cross section of the passage is reduced, for example.

For example, the isolation valve is designed to be actuated electrically and/or electromagnetically, in particular to be adjusted and/or switched between the closed position and the open position, for example, to be adjusted and/or switched continuously or stepped and/or digitally or analogously. For example, the isolation valve is or comprises a 2/2-way valve which, for example, assumes the open position in a non-actuated state and the closed position in an actuated state. If it is an electrically or electromagnetically actuated isolation valve, it is, for example, not energized in the non-actuated state and energized in the actuated state. For example, the isolation valve is a valve with an N/O function. N/O function means that the valve is open in the de-energized state. Such a valve can also be called a "normally open" (N/O) valve. For example, in one exemplary arrangement, the isolation valve is a directly controlled solenoid valve with an N/O function.

In the present description, the term "pressure reduction valve" refers in particular to a shut-off device, by which the associated drain line can be at least partially or completely opened, starting, for example, from a blocked state. For example, the pressure reduction valve has a passage for fluid, in particular the hydraulic fluid, which can be changed in cross section. For example, the pressure reduction valve is designed to be adjusted between a closed position and an open position, for example, with respect to the passage, wherein the associated drain line is at least partially or completely open in the open position. In the above-described "closed state," which is also called the "locked state," the pressure reduction valve is, for example, in the closed position. If the pressure reduction valve is adjusted in the direction away from the closed state, the cross section of the passage is enlarged, for example. If the pressure reduction valve is adjusted in the direction of the closed state, the cross section of the passage is reduced, for example.

For example, the pressure reduction is designed to be actuated electrically or electromagnetically, in particular to be adjusted and/or switched between the closed position and the open position, for example, to be adjusted and/or switched continuously or stepped and/or digitally or analogously. For example, the pressure reduction valve is or comprises a 2/2-way valve which, for example, assumes the closed position in a non-actuated state and the open position in an actuated state. If it is an electrically or electromagnetically actuated pressure reduction valve, it is, for example, not energized in the non-actuated state and energized in the actuated state. For example, the pressure reduction valve is a valve with an WC function. N/C function means that the valve is closed in the de-energized state. Such a valve can also be called a "normally closed" (N/C) valve. For example, the pressure relief valve is preferably a directly controlled solenoid valve with an N/C function.

BRIEF DESCRIPTION OF DRAWINGS

Further details and features of the disclosure can be found in the following description of at least one exemplary arrangement using the drawings, in which.

DETAILED DESCRIPTION

Figure 1:
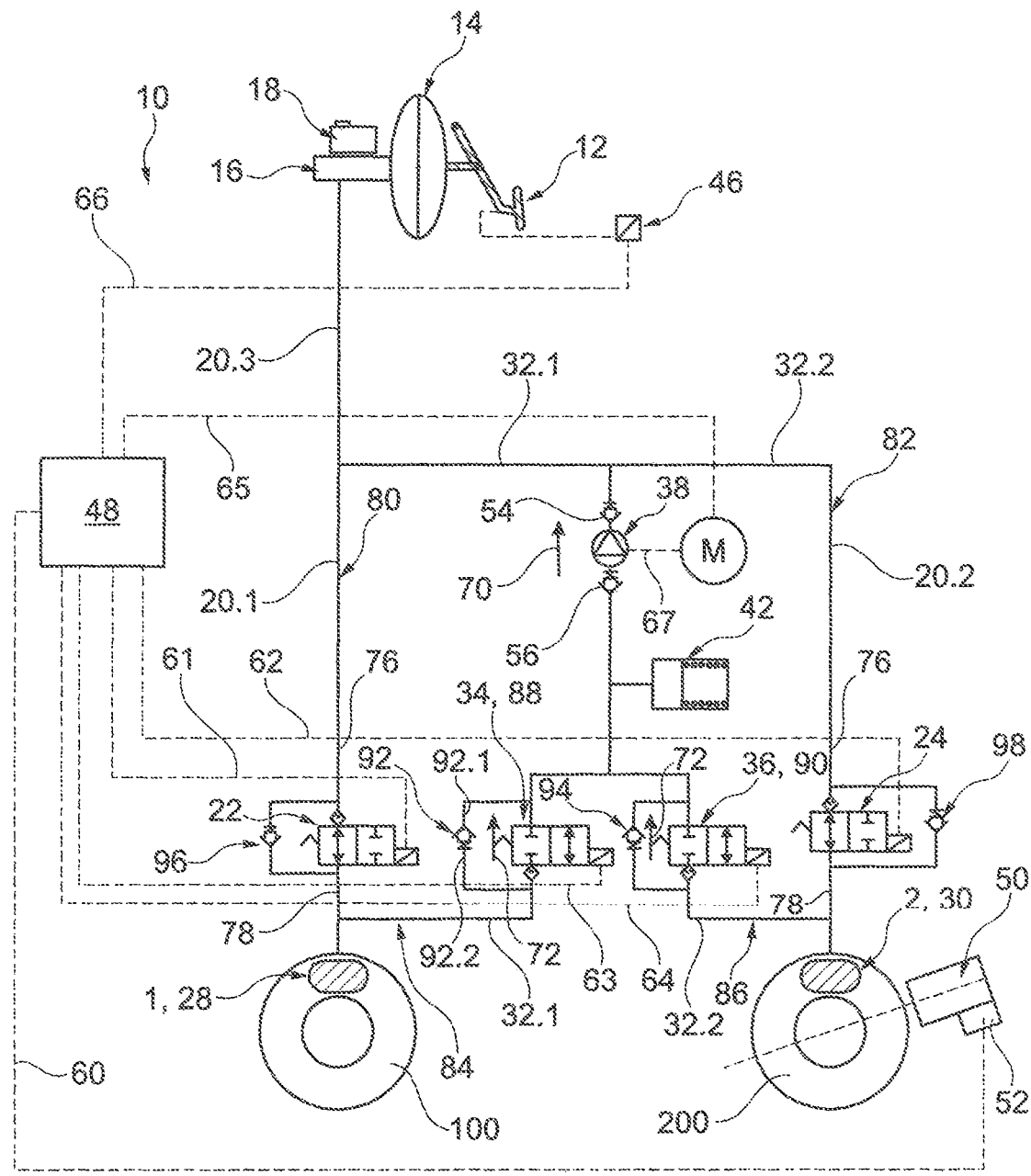
FIG. 1 schematically shows a possible exemplary arrangement of a hydraulic braking system for a motor vehicle having a regenerative braking function.

FIG. 1 shows a possible exemplary arrangement of a hydraulic braking system 10 which is suitable for use in a motor vehicle having a regenerative braking function. FIG. 1 shows the hydraulic braking system 10 by way of example in connection with two vehicle wheels 100, 200 of such a motor vehicle. The hydraulic braking system 10 is designed to allow a regenerative braking process. In the regenerative braking process, the kinetic energy of the motor vehicle is used to drive an electrical machine 50 as a generator and to generate electric energy in this way. In the regenerative braking process, a drag torque originating from the electrical machine 50 in generator mode is also used as braking force.

By way of example, the electrical machine 50 in FIG. 1 is assigned to one of the vehicle wheels 100, 200, and in one particular exemplary arrangement to the vehicle wheel 200, in order to illustrate that the electrical machine 50 is driven by the movement of the vehicle, i.e., by the rotation of the vehicle wheel 200. In one exemplary arrangement, the electrical machine 50 is a component of an electric drive of the motor vehicle, which is used, for example, to drive the vehicle wheel 200. For example, this electric drive is used as a generator during a regenerative braking process.

The hydraulic braking system 10 comprises at least two wheel brakes, for example, a first wheel brake 28 and a second wheel brake 30, which can each be assigned to a vehicle wheel. For example, the first wheel brake 28 is assigned to the one vehicle wheel 100 and the second wheel brake 30 is assigned to the other vehicle wheel 200. For example, one vehicle wheel 100 is a front wheel and the other vehicle wheel 200 is a rear wheel. In this respect, the first wheel brake 28 can be a front wheel brake 1 and the second wheel brake 30 can be a rear wheel brake 2. For example, the at least two wheel brakes are a component of one of at least two brake circuits of the hydraulic braking system 10.

The hydraulic braking system 10 further comprises a brake cylinder 16. In one exemplary arrangement, the brake cylinder 16 is hydraulically connected to the first wheel brake 28 and the second wheel brake 30 via a hydraulic connection 80 or 82, respectively. The brake cylinder 16 is designed to displace a hydraulic fluid in the direction of the first wheel brake 28 and the second wheel brake 30 via the respective hydraulic connection 80 or 82. The first wheel brake 28 and the second wheel brake 30 are designed to exert a braking force, for example, as a frictional force, on the associated vehicle wheel 100 or 200 by the hydraulic fluid. Each hydraulic connection 80 or 82 comprises a brake line 20.1 or 20.2 or is formed by a brake line 20.1 or 20.2. For example, the brake lines 20.1, 20.2 are hydraulically connected to the brake cylinder 16 via a common line portion 20.3. A further isolation valve (not shown in FIG. 1) can be assigned to the common line portion 20.3.

In one exemplary arrangement, the first wheel brake 28 and the second wheel brake 30 are each assigned a drain line 84 or 86 which is used to drain at least a volume fraction of the hydraulic fluid from the associated hydraulic connection 80 or 82 between the brake cylinder 16 and the associated wheel brake 28 or 30. In one exemplary arrangement, the first wheel brake 28 and the second wheel brake 30 are each assigned an opening device 88 or 90 which is used to open the hydraulic connection 80 or 82 between the brake cylinder 16 and the associated wheel brake 28 or 30. The hydraulic connection 80 or 82 can be opened by the opening device 88 or 90, if necessary, in order to counteract or even completely prevent, for example, a build-up of hydraulic brake pressure in the associated wheel brake 28 or 30. In this case, the hydraulic fluid set in motion when the brake cylinder 16 is actuated will at least partially escape from the hydraulic connection 80 or 82, for example, via an opening formed or exposed by the opening device 88 or 90.

The opening device 88 or 90 is also designed to close the hydraulic connection 80 or 82. When the hydraulic connection 80 or 82 is closed, the hydraulic fluid set in motion when the brake cylinder 16 is actuated will entirely reach the associated wheel brake 28 or 30 and the desired hydraulic brake pressure will build up in the associated wheel brake 28 or 30. The opening device 88 or 90 is or comprises a valve which in the following will also be called a pressure reduction valve 34 or 36.

The opening device 88 of the first wheel brake 28 is assigned a pressure relief device 92 which is fluidically connected in parallel to the opening device 88 of the first wheel brake 28. The pressure relief device 92 has a hydraulic input side 92.1 and a hydraulic output side 92.2, wherein, for example, the hydraulic input side 92.1 fluidically faces in the direction of the accumulator 42 and the hydraulic output side 92.2 fluidically faces in the direction of the associated wheel brake, i.e., the first wheel brake 28, It is provided that the pressure relief device 92 is closed in the draining direction 72 and opens in the opposite direction of the draining direction 72 when a maximum pressure difference is reached between the input side 92.1 and the output side 92.2.

For example, the opening device 90 of the second wheel brake 30 can also be assigned a pressure relief device 94 which is preferably fluidically connected in parallel to the opening device 90 of the second wheel brake 30 and which, for example, is closed in the draining direction 72 and opens in the opposite direction of the draining direction 72 when a maximum pressure difference between the input side and the output side of the pressure relief device 94 is reached.

In one exemplary arrangement, the hydraulic braking system 10 has an accumulator 42 which is hydraulically connected, for example, to the drain lines 84, 86. The accumulator 42 is designed to store at least a volume fraction of the hydraulic fluid, in particular to store it under an accumulator pressure, in particular to store it temporarily. For example, in one exemplary arrangement, the accumulator 42 is a low-pressure accumulator. For example, the accumulator 42 may be a piston accumulator. If one of the drain lines 84, 86 is open and the hydraulic braking system 10 is actuated, the displaced hydraulic fluid can thus be at least partially stored, and in particular exemplary arrangement, temporarily stored, in the accumulator 42.

A brake pedal 12, via which the brake cylinder 16 is to be actuated, is assigned to the hydraulic braking system 10. A storage container 18 is assigned to the brake cylinder 16 in order to store hydraulic fluid therein for the hydraulic braking system 10. The storage container 18 can have an inlet opening in order to be refilled or filled up via said inlet opening. A brake booster 14 can be provided to amplify an actuating force applied via the brake pedal 12, for example, by a driver of the motor vehicle. In one exemplary arrangement, the brake booster 14 amplifies the actuating force in a known manner according to a pneumatic, electrohydraulic or electromechanical principle. In order to actuate the brake cylinder 16 independently of an actuation of the brake pedal 12 by the driver for an automatic vehicle control, an electrically controlled brake booster (EBB: electronic brake booster) can also be provided.

In one exemplary arrangement, the hydraulic braking system 10 further comprises an isolation valve 22 which is fluidically assigned to the hydraulic connection 80 or the brake line 20.1 and designed to close the hydraulic connection 80 or the brake line 20.1. For example, in this way, the first wheel brake 28 is supposed to be at least partially or completely hydraulically isolated from the brake cylinder 16. The hydraulic braking system 10 can also comprise a further isolation valve 24 which is fluidically assigned to the hydraulic connection 82 or the brake line 20.2 and designed to close the hydraulic connection 82 or the brake line 20.2. For example, in this way, the second wheel brake 30 is supposed to be at least partially or completely hydraulically isolated from the brake cylinder 16.

The respective isolation valve 22 or 24 is to be adjusted between a closed position and an open position in order to interrupt the associated hydraulic connection 80 or 82, in particular to close or block, either completely or at least partially, close or block, the associated brake line 20.1 or 20.2. In the closed position of the isolation valve 22 or 24, the associated hydraulic connection 80 or 82 is interrupted and/or the associated brake line 20.1 or 20.2 is blocked, and in one exemplary arrangement completely blocked or at least largely or essentially blocked. In the open position of the isolation valve 22 or 24, the associated hydraulic connection 80 or 82 and/or the associated brake line 20.1 or 20.2 is open, for example, largely open or completely open.

The hydraulic braking system 10 also has at least one, and in one exemplary arrangement, two, return lines 32.1, 32.2, wherein the one return line 32.1 is assigned to the first wheel brake 28 and the other return line 32.2 is assigned to the second wheel brake 30. The drain line 84 for the first wheel brake 28 is a component of the return line 32.1 or forms the return line 32.1. The drain line 86 for the second wheel brake 30 is a component of the return line 32.2 or forms the return line 32.2. The return lines 32.1 and 32.2 return at least a volume fraction of the hydraulic fluid from a region 78 downstream of the respective associated isolation valve 22 or 24 to a region 76 upstream of the respective associated isolation valve 22 or 24.

For example, one end of the return lines 32.1 and 32.2 is flow-connected to the associated hydraulic connection 80 or 82, in particular to the associated brake line 20.1 or 20.2, in a region between the associated isolation valve 22 or 24 and the associated wheel brake 28 or 30, Another end of the return lines 32.1 and 32,2 is flow-connected to the associated hydraulic connection 80 or 82, in particular to the associated brake line 20.1 or 20.2, in a region between the associated isolation valve 22 or 24 and the brake cylinder 16. In this way, at least a volume fraction of the hydraulic fluid can be returned from the associated wheel brake 28 or 30 to the respective supply line 20.1 or 20.2 while bypassing the associated isolation valve 22 or 24.

For example, the isolation valve 22 and/or the isolation valve 24 can be assigned a pressure relief device 96 or 98 which is fluidically connected in parallel to the associated isolation valve 22 or 24 and closed in the direction of the associated wheel brake 28 or 30 and opens in the opposite direction, i.e., in the direction from the associated wheel brake 28 or 30 to the brake cylinder 16 when a maximum pressure difference between the downstream region 78 and the upstream region 76 is reached.

In the present description, "downstream region" refers in particular to the receiving volume of the braking system 10 for receiving hydraulic fluid, which, as seen looking in the direction from the brake cylinder 16 to the associated wheel brake 28 or 30, is connected downstream of the isolation valve 22 or 24, For example, the downstream region 78 comprises, downstream of the isolation valve 22 or 24, a hydraulic receiving volume of the associated hydraulic connection 80 or 82, in particular of the associated brake line 20.1 or 20.2, and/or a hydraulic receiving volume of the associated wheel brake 28 or 30.

In the present description, "upstream region" refers in particular to the receiving volume of the braking system 10 for receiving hydraulic fluid, which, as seen looking in the direction from the brake cylinder 16 to the associated wheel brake 28 or 30, is connected upstream of the isolation valve 22 or 24. For example, the upstream region 76 comprises, upstream of the isolation valve 22 or 24, a hydraulic receiving volume of the associated hydraulic connection 80 or 82, in particular of the associated brake line 20.1 or 20.2, and/or a hydraulic receiving volume of the associated wheel brake 28 or 30.

The hydraulic braking system 10 comprises a pump 38 for returning at least a volume fraction of the hydraulic fluid from the drain line 84 or 86 and/or the accumulator 42 in the direction of the brake cylinder 16 and/or for building up hydraulic pressure in the first wheel brake 28 or the second wheel brake 30. The pump 38 is hydraulically connected to the drain lines 84, 86 and/or to the return lines 32.1, 32.2. The pump 38 is designed to convey, and in one exemplary arrangement, to convey in a return direction 70, at least a volume fraction of the hydraulic fluid. Said conveying by the pump 38 in the return direction 70 conveys the at least one volume fraction of the hydraulic fluid in the direction of the upstream region 76. The conveying in the return direction 70 is ensured in that at least one, and in one exemplary arrangement, two, check valves 54, 56 are provided and, for example, the pump 38 is arranged between them.

In one exemplary arrangement, as seen looking in the return direction 70 of the hydraulic fluid, the respective opening device 88 or 90, in one exemplary arrangement, the respective pressure reduction valve 34 or 36, and the pump 38, and the accumulator 42 are arranged in such a sequence that the respective opening device 88 or 90 or the respective pressure reduction valve 34 or 36 comes first, followed either by the pump 38 or the accumulator 42. By opening the drain line 84 or 86, the accumulator 42 is thus filled with the returned volume fraction of the hydraulic fluid.

The hydraulic braking system 10 further comprises a control unit 48, such as, for example, an electrical control unit, for controlling the isolation valves 22, 24 and/or the opening devices 88, 90, and in one particular exemplary arrangement, the pressure reduction valves 34, 36, and/or the pump 38. For this purpose, the control unit 48 is, for example, signal-connected to the isolation valves 22, 24 and/or to the opening devices 88, 90, and in one particular example, to the pressure reduction valves 34, 36, and/or to the pump 38 via a corresponding signal line 61 or 62 or 63 or 64 or 65, for example, an electrical signal line. In one exemplary arrangement, the isolation valves 22, 24 and/or the opening devices 88, 90, for example the pressure reduction valves 34, 36, and/or the pump 38 each have an electrical receiving unit in order to process the control signals transmitted by the control unit 48 and to initiate or carry out a corresponding actuation of the isolation valve 22 or 24 or the opening device 88 or 90 or the pressure reduction valve 34 or 36 or the pump 38.

For this purpose, the pump 38 can, for example, have a corresponding actuation device, such as an electric drive motor M, which is controlled via the signal line 65 and acts on the pump 38, and in one exemplary arrangement, on a working cylinder of the pump 38, via a mechanical and/or hydraulic and/or electromagnetic control connection 67. Both the control signals and the status signals, for example, signals with information about monitored or detected parameters, are preferably to be transmitted via the signal lines 61, 62, 63.

The control unit 48 is signal-connected to the electrical machine 50, for example, via a signal line 60, in order to transmit control signals from the control device 48 to the electrical machine 50 and/or, conversely, transmit control signals or signals containing information, for example, about an operating state of the electrical machine 50, to the control unit 48. For this purpose, the electrical machine 50 can have a control device 52 which communicates with the control unit 48 via the signal line 60 and controls the electrical machine 50, and in one exemplary arrangement, controls it directly and immediately.

Furthermore, the control unit 48 is signal-connected via a signal line 66 to a sensor element, such as, for example, a pedal travel sensor 46, assigned to the brake pedal 12. The pedal travel sensor 46 is used to detect a pedal travel of the brake pedal 12, Information about the pedal travel of the brake pedal 12 can be taken into account by the control unit 48 via the signal connection between the pedal travel sensor 46 and the control unit 48.

FIG. 1 shows the hydraulic braking system 10 in an initial state. In the initial state, the isolation valves 22, 24 are in an open position, so that the hydraulic connections 80, 82 between the brake cylinder 16 and the respective wheel brake 28 and 30 are open, and in one particular arrangement, the brake lines 20.1, 20.2 are open. In the initial state, the opening devices 88, 90, and in one exemplary arrangement, the pressure reduction valves 34, 36, are also in a closed state, so that the drain lines 84, 86 are closed or blocked and a draining of hydraulic fluid from the hydraulic connections 80, 82 between the brake cylinder 16 and the respective wheel brake 28 and 30 is thus prevented. In the initial state, no hydraulic fluid is conveyed by the pump 38. The accumulator 42 is empty or at least largely empty.

The hydraulic braking system 10 is in the initial state when hydraulic braking is to be carried out. When the hydraulic braking system 10 is actuated, for example, by actuating the brake pedal 12, and a displacement of the hydraulic fluid is thus effected by the brake cylinder 16, the hydraulic fluid reaches the first wheel brake 28 and the second wheel brake 30 via the hydraulic connections 80, 82 or the brake lines 20.1, 20.2 and builds up a hydraulic pressure, by which the first wheel brake 28 and the second wheel brake 30 exert a hydraulic braking force.

The hydraulic braking system 10 also makes it possible that, in spite of its actuation and a resulting displacement of the hydraulic fluid, there is no or at least largely no hydraulic braking force. For this purpose, the hydraulic braking system 10 uses, for example, the accumulator 42 in which the hydraulic fluid or at least a volume fraction of the hydraulic fluid is stored, and in one exemplary arrangement, temporarily stored. For this to be achieved, the hydraulic braking system 10 is designed to perform a free travel release.

Such an operating mode of the hydraulic braking system 10 is appropriate when the hydraulic braking system 10 is used in a motor vehicle having a regenerative braking function. In order to optimally use the regenerative braking function when braking the motor vehicle, a hydraulic braking force must be avoided or at least reduced to a minimum at least over a period of time or over a phase of the braking process and/or on the basis of a momentary braking force request. In this respect, any hydraulic residual pressure in the wheel brakes 28, 30 must also be minimized as much as possible in order to counteract a residual slip torque and thus a loss torque in the wheel brakes 28, 30, improving recuperation as a result.

This type of free travel release can influence the level of any hydraulic residual pressure in the wheel brakes 28, 30 and thus achieve a positive effect on recuperation. One possibility provides that—starting from the initial state—only one wheel brake, for example, the second wheel brake 30, is released toward the accumulator 42, and the other wheel brakes, for example, the first wheel brake 28, are hydraulically isolated. For this purpose, the control unit 48 is designed to cause the opening device 88 of the first wheel brake 28 and the opening device 90 of the second wheel brake 30 to open and to cause the isolation valve 22 of the first wheel brake 28 to close when a generative braking force of the electrical machine 50 is present or about to occur, for example when the control unit 48 detects or has detected an electrical signal with information about a presence or imminent occurrence of a generative braking force of the electrical machine 50. The isolation valve 24 of the second wheel brake 30 remains open.

Starting from the initial state, the opening device 88 of the first wheel brake 28 and the opening device 90 of the second wheel brake 30 are thus opened and the isolation valve 22 of the first wheel brake 28 is closed by the control unit 48. The hydraulic braking system 10 is thus brought into a state in which the hydraulic connection 82 between the brake cylinder 16 and the second wheel brake 30 is maintained, but the hydraulic connection 80 between the brake cylinder 16 and the first wheel brake 28 is interrupted, and a hydraulic passage from both the first wheel brake 28 and the second wheel brake 30 toward the accumulator 42 is released.

Figure 2:
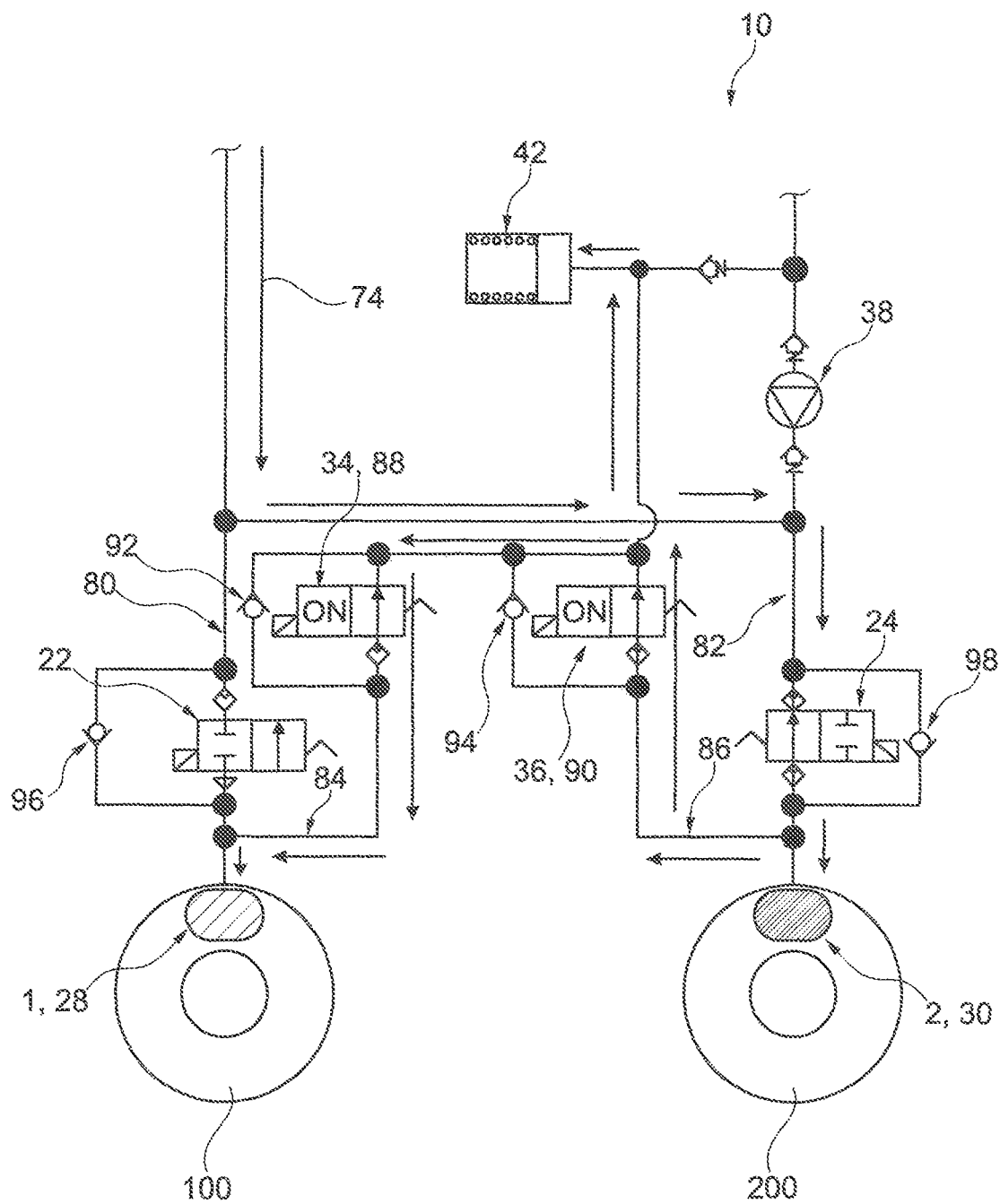
FIG. 2 shows a first possible valve circuit at a free travel release of the hydraulic braking system according to FIG. 1.

FIG. 2 shows a section of the hydraulic braking system 10 of FIG. 1, wherein the above-described switching of the isolation valve 22 to a closed position and the switching of the opening devices 88, 90 to an open position is carried out. In FIG. 2, the flow path of the hydraulic fluid is also indicated by arrows 74 when the hydraulic braking system 10 is actuated, for example, by actuating the brake pedal 12 (FIG. 1), and a resulting displacement of the hydraulic fluid takes place. As can be seen, the hydraulic fluid reaches the accumulator 42 exclusively via the hydraulic connection 82 between the brake cylinder 16 and the second wheel brake 30 and via the associated drain line 86 because the isolation valve 22 is closed and the hydraulic connection 80 between the brake cylinder 16 and the second wheel brake 28 is thus interrupted.

Due to the opened opening device 88 and the resulting hydraulic passage from the accumulator 42 to the first wheel brake 28, at least a volume fraction of the hydraulic fluid will flow into the first wheel brake 28 via said hydraulic passage and thus, due to the acting accumulator pressure in the filled accumulator 42, build up hydraulic pressure or residual pressure in the first wheel brake 28. The hydraulic residual pressure is so low that the possibly existing pressure relief device 96 does not open.

A changing accumulator pressure in the accumulator 42 also effects changes in the level of the hydraulic residual pressure in the first wheel brake 28. As a result, a pressure advantage is achieved in the first wheel brake 28 and recuperation is thus improved. For example, there is a change in the accumulator pressure between filling and emptying the accumulator 42. This hysteresis behavior of the accumulator 42 is present due to the system if the accumulator 42 is, for example, a piston accumulator and is effected, for example, by friction and/or viscoelastic behavior of the seal for the piston of the piston accumulator resulting from the changing accumulator pressure.

Figure 3:
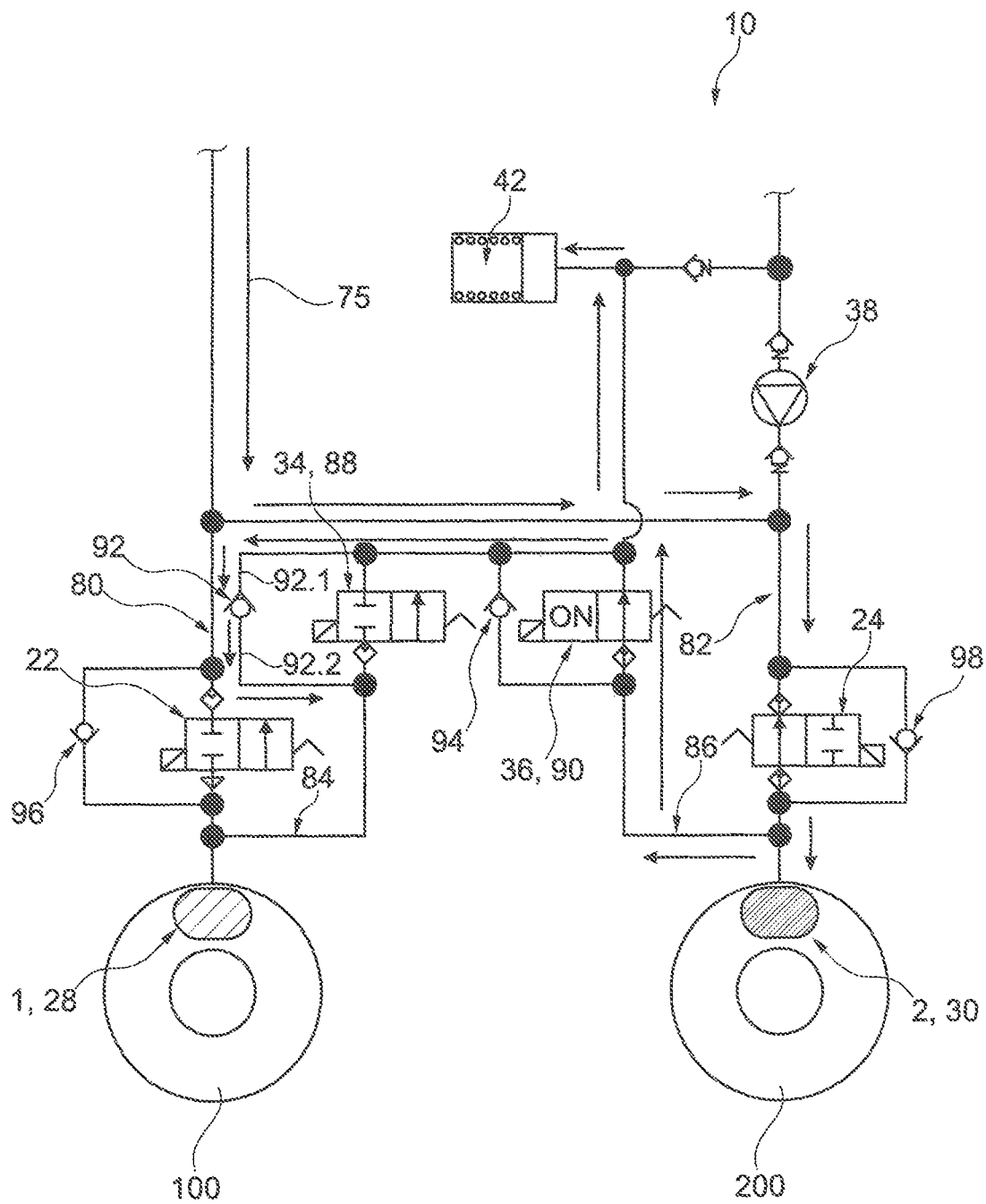
FIG. 3 shows a second possible valve circuit at a free travel release of the hydraulic braking system according to FIGS. 1.

FIG. 3 shows a section of the hydraulic braking system 10 of FIG. 1, wherein further or other possibilities of free travel release are depicted. For this purpose, the control unit 48 is designed to cause the opening device 90 of the second wheel brake 30 to open and the isolation valve 22 of the first wheel brake 28 to close when a generative braking force of the electrical machine 50 is present or about to occur, for example, when an electrical signal with information about a presence or imminent occurrence of a generative braking force of the electrical machine 50 is detected or has been detected by the control unit 48. However, in the present case, the opening device 88 of the first wheel brake 28 remains in the closed position. The isolation valve 24 of the second wheel brake 30 remains open.

Starting from the initial state, the opening device 90 of the second wheel brake 30 is thus opened and the isolation valve 22 of the first wheel brake 28 is closed by the control unit 48. The hydraulic braking system 10 is thus brought into a state in which the hydraulic connection 82 between the brake cylinder 16 and the second wheel brake 30 is maintained, but the hydraulic connection 80 between the brake cylinder 16 and the first wheel brake 28 is interrupted, and a hydraulic passage is released from the second wheel brake 30 to the accumulator 42, whereas a hydraulic passage from the first wheel brake 28 to the accumulator 42 is not released.

In FIG. 3, the flow path of the hydraulic fluid is indicated by arrows 75 when the hydraulic braking system 10 is actuated, for example, by actuating the brake pedal 12 (FIG. 1), and a resulting displacement of the hydraulic fluid takes place. As can be seen, the hydraulic fluid reaches the accumulator 42 exclusively via the hydraulic connection 82 between the brake cylinder 16 and the second wheel brake 30 and via the associated drain line 86 because the isolation valve 22 is dosed and the hydraulic connection 80 between the brake cylinder 16 and the second wheel brake 28 is thus interrupted.

In contrast to the exemplary arrangement according to FIG. 2, the opening device 88 of the first wheel brake 28 in the exemplary arrangement according to FIG. 3 remains closed and thus no hydraulic passage from the accumulator 42 to the first wheel brake 28 is affected. In this respect, the first wheel brake 28 is completely hydraulically isolated and there is initially no hydraulic pressure in the first wheel brake 28, which is indicated by the dashed line between the first wheel brake 28 and the pressure relief device 92 and the opening device 88. As a result, a pressure advantage is achieved in the first wheel brake 28 and recuperation is thus improved.

However, due to the acting accumulator pressure of the filled accumulator 42, a hydraulic pressure will build up on the input side 92.1 of the pressure relief device 92. If said hydraulic pressure builds up such a large pressure difference between the input side 92.1 and the output side 92.2 of the pressure relief device 92 that, for example, a predetermined maximum pressure difference for the pressure relief device 92 is reached, the pressure relief device 92 will open and a hydraulic pressure or residual pressure will build up in the first wheel brake 28. Such a situation can be present if the function of the pressure relief device 92 is performed by a sealing element of the opening device 92 in a system-related manner. This is the case, for example, when the sealing element is a lip seal. In the case of the lip seal, the sealing lip may fold over, so that a flow passage through the opening device 88 is or will be exposed, for example, in one flow direction.

Figure 4:
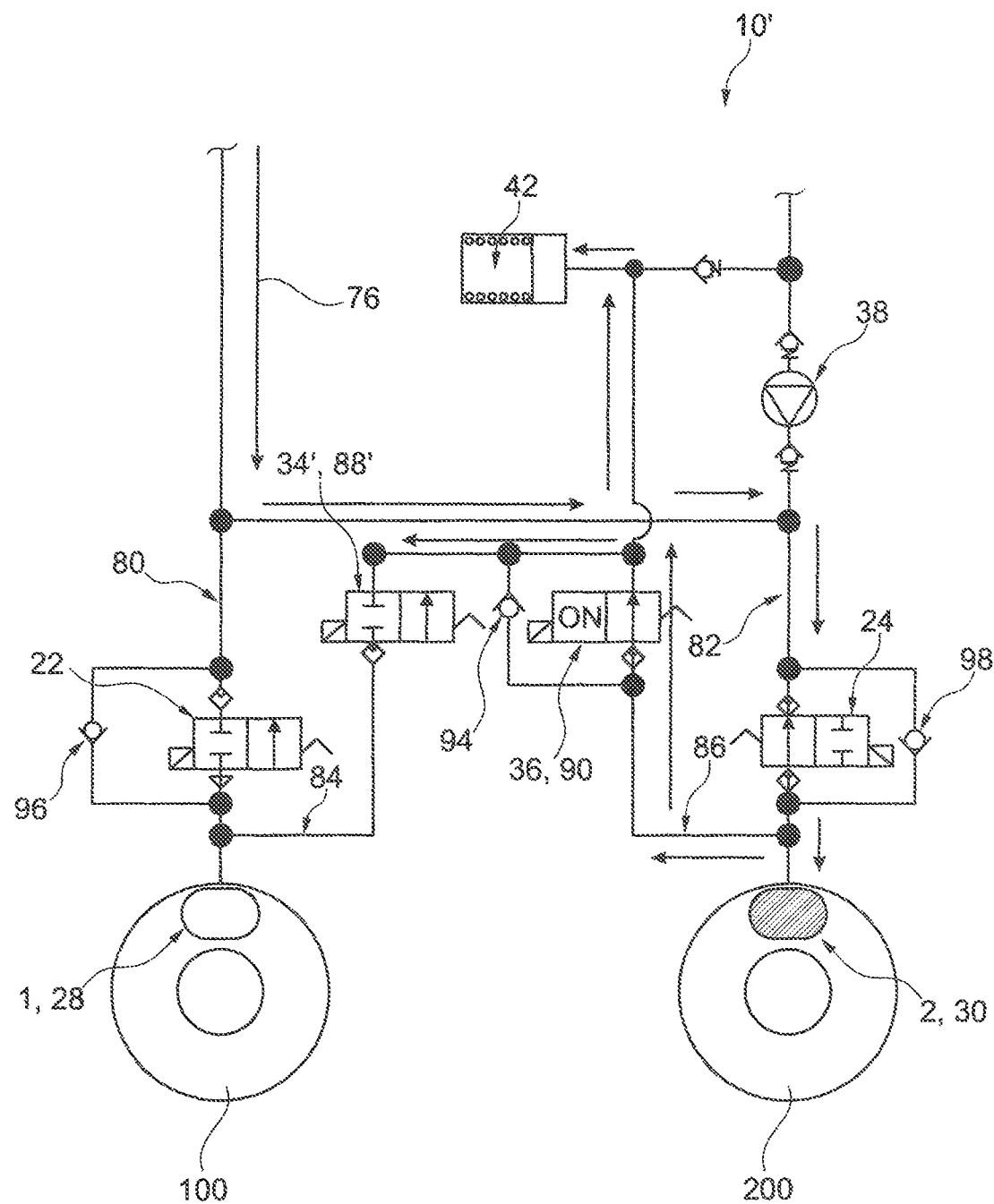
FIG. 4 shows the second possible valve circuit at a free travel release of a modified design of the hydraulic braking system according to FIG. 1.

FIG. 4 shows a hydraulic braking system 10' which is slightly modified with regard to the hydraulic braking system, wherein only a section of the hydraulic braking system 10' is shown in FIG. 4, namely in the manner of the depiction in FIGS. 2 and 3. In FIG. 4, the flow path of the hydraulic fluid is indicated by arrows 76 when the hydraulic braking system 10' is actuated, for example, by actuating the brake pedal 12 (FIG. 1), and a resulting displacement of the hydraulic fluid takes place.

In the hydraulic braking system 10', in contrast to the hydraulic braking system 10 of FIG. 1, an opening device 88' or a pressure reduction valve 34' is assigned to the first wheel brake 28 without an associated pressure relief device or pressure relief function. As a result—in contrast to the exemplary arrangement according to FIG. 3—no hydraulic passage from the accumulator 42 to the first wheel brake 28 will be affected permanently with the acting accumulator pressure of the filled accumulator 42. In this respect, the first wheel brake 28 is permanently and completely hydraulically isolated and no hydraulic pressure is permanently applied in the first wheel brake 28 as long as the hydraulic fluid is stored in the accumulator 42.

The modified braking system 10' can be realized by retrofitting the braking system 10 in that, with regard to the pressure relief device 92, an existing lip seal, for example, or a similar sealing element is replaced by a sealing element, by which a higher pressure difference can be produced, so that the pressure relief device 92 does not open with the acting accumulator pressure.

In the present description, reference to a specific aspect or a specific arrangement or a specific design means that a specific feature or a specific property described in connection with the respective aspect or the respective arrangement or the respective design is at least contained therein but does not necessarily have to be contained in all aspects or arrangements or designs of the disclosure. It must be expressly noted that any combination of the different features and/or structures and/or properties described in relation to the disclosure are included in the disclosure unless expressly or clearly contradicted by the context.

The use of some or all of the examples or an exemplary mode of expression in the text is only intended to illuminate the disclosure and does not constitute a limiting effect on the scope of the disclosure, unless stated otherwise. In addition, no mode of expression or wording in the description is to be understood to mean that it refers to an element which is not claimed but essential to the practice of the disclosure.

The invention claimed is:

1. A method for operating a hydraulic braking system in a motor vehicle having a regenerative braking function first and second wheel brakes, wherein with respect to the at least second wheel brake carrying out a hydraulic free travel release to open an opening device of the at least second wheel brake such that, with respect to the at least second wheel brake, a hydraulic passage to an accumulator is released, thereby storing therein at least a volume fraction of a hydraulic fluid in the event of a displacement of the hydraulic fluid, and closing an isolation valve such that the at least one other wheel brake is hydraulically isolated when a generative braking force of an electrical machine is present or about to occur.

2. The method according to claim 1, wherein a further hydraulic passage to the accumulator remains closed with respect to the at least one other wheel brake.

3. The method according to claim 1, wherein, with respect to the at least one other wheel brake, a further hydraulic passage to the accumulator or to a further accumulator is released.

4. A hydraulic braking system for a motor vehicle having a regenerative braking function, comprising:
a brake cylinder and at least two wheel brakes, wherein the brake cylinder is hydraulically connected to the at least two wheel brakes via a hydraulic connection and designed to displace a hydraulic fluid in a direction of the at least two wheel brakes, and wherein the at least two wheel brakes are designed to exert a hydraulic braking force by of the hydraulic fluid;
wherein the at least two wheel brakes comprise a first wheel brake and a second wheel brake, each of the first and second wheel brakes having:
a drain line for draining at least a volume fraction of the hydraulic fluid from the hydraulic connection between the brake cylinder and the associated wheel brake;
an opening device for opening the hydraulic connection between the brake cylinder and the associated wheel brake in order to drain the at least one volume fraction of the hydraulic fluid into the drain line;
wherein at least the first wheel brake is assigned an isolation valve for closing the hydraulic connection between the brake cylinder and the first wheel brake in order to hydraulically isolate the first wheel brake;
the hydraulic braking system further comprising:
at least one accumulator which is hydraulically connected to the drain line and designed to store at least a volume fraction of the hydraulic fluid under an accumulator pressure; and
a control unit which is designed to cause the opening device of the first wheel brake and the opening device of the second wheel brake to open and the isolation valve to close when a generative braking force of an electrical machine is present or about to occur.

5. The braking system according to claim 4, wherein the control unit is designed to cause the opening device of the second wheel brake to open and the isolation valve to close when a generative braking force of the electrical machine is present or about to occur, and-when a gradient of an actuation path of an actuation element operatively connected to the brake cylinder or a momentary value of a parameter corresponding thereto is smaller than a default value.

6. The braking system according to claim 4, wherein the control unit is designed to cause the opening device of the first wheel brake and the opening device of the second wheel brake to open and to cause the isolation valve to close when a generative braking force of the electrical machine is present or about to occur, and-when a gradient of an actuation travel of an actuation element operatively connected to the brake cylinder or a momentary value of a parameter corresponding thereto is smaller than a default value.

7. The braking system according to claim 4, wherein the accumulator is a piston accumulator.

8. The braking system according to claim 4, further comprising
a pump for returning at least a volume fraction of the hydraulic fluid from the drain line and/or the accumulator in the direction of the brake cylinder and/or for building up hydraulic pressure in the at least two wheel brakes, wherein the control unit is signal-connected to the pump and designed to control the pump in order to return at least a volume fraction of the hydraulic fluid from the drain line and/or the accumulator in a direction of the brake cylinder or to build up hydraulic pressure in the at least two wheel brakes.

9. A hydraulic braking system for a motor vehicle having a regenerative braking function, comprising:

a brake cylinder and at least two wheel brakes, wherein the brake cylinder is hydraulically connected to the at least two wheel brakes via a hydraulic connection and designed to displace a hydraulic fluid in a direction of the at least two wheel brakes, and wherein the at least two wheel brakes are designed to exert a hydraulic braking force by of the hydraulic fluid;

wherein the at least two wheel brakes comprise a first wheel brake and a second wheel brake, each of the first and second wheel brakes having:

a drain line for draining at least a volume fraction of the hydraulic fluid from the hydraulic connection between the brake cylinder and the associated wheel brake;

an opening device for opening the hydraulic connection between the brake cylinder and the associated wheel brake in order to drain the at least one volume fraction of the hydraulic fluid into the drain line;

wherein at least the first wheel brake is assigned an isolation valve for closing the hydraulic connection between the brake cylinder and the first wheel brake in order to hydraulically isolate the first wheel brake;

the hydraulic braking system further comprising:

at least one accumulator which is hydraulically connected to the drain line and designed to store at least a volume fraction of the hydraulic fluid under an accumulator pressure, and wherein the control unit is designed to cause the opening device of the second wheel brake to open and the isolation valve to close when a generative braking force of the electrical machine is present or about to occur, wherein the opening device of the first wheel brake remains in a closed position.

10. The braking system according to claim 9, wherein the control unit is designed to cause the opening device of the second wheel brake to open and the isolation valve to close when a generative braking force of the electrical machine is present or about to occur, and when a gradient of an actuation path of an actuation element operatively connected to the brake cylinder or a momentary value of a parameter corresponding thereto is smaller than a default value, wherein the opening device of the first wheel brake remains in a closed position.

11. The braking system according to claim 9, wherein at least the first wheel brake is further assigned a pressure relief device which is fluidically connected in parallel to the opening device of the first wheel brake and has an inlet side and an outlet side, wherein the pressure relief device is closed in a draining direction and opens in the opposite direction of the draining direction when a maximum pressure difference between the input side and the output side is reached.

12. The braking system according to claim 11, wherein the pressure relief device is set to a difference value for a maximum pressure difference between the input side and the output side of the opening device, which is smaller than a maximum pressure difference between an accumulator pressure of the accumulator and a fluid pressure in the first wheel brake.

13. The braking system according to claim 11, wherein the opening device of the first wheel brake has a sealing element which performs a function of the pressure relief device.

14. The braking system according to claim 13, wherein the sealing element is a lip seal.

15. The braking system according to claim 11, wherein the pressure relief device is set to a difference value for a maximum pressure difference between the input side and the output side of the opening, which is greater than a maximum pressure difference between a accumulator pressure of the accumulator and a fluid pressure in the first wheel brake.

16. The braking system according to claim 15, wherein the opening device of the first wheel brake has a sealing element which performs a function of the pressure relief device.

17. The braking system according to claim 16, wherein the sealing element is an O-ring.

18. The braking system according to claim 11, wherein the accumulator is a piston accumulator.

* * * * *